(12) United States Patent
Cha

(10) Patent No.: US 9,644,691 B2
(45) Date of Patent: May 9, 2017

(54) FLUID FAN CLUTCH

(71) Applicant: COOLING SYSTEM CO., LTD., Gimhae-si (KR)

(72) Inventor: Jung Ok Cha, Gimhae-si (KR)

( * ) Notice: Subject to any disclaimer, the term of this patent is extended or adjusted under 35 U.S.C. 154(b) by 0 days.

(21) Appl. No.: 14/893,546

(22) PCT Filed: Jun. 11, 2014

(86) PCT No.: PCT/KR2014/005127
§ 371 (c)(1),
(2) Date: Nov. 24, 2015

(87) PCT Pub. No.: WO2014/208908
PCT Pub. Date: Dec. 31, 2014

(65) Prior Publication Data
US 2016/0131204 A1    May 12, 2016

(30) Foreign Application Priority Data

Jun. 26, 2013  (KR) .................... 10-2013-0073557

(51) Int. Cl.
*F16D 35/02*    (2006.01)
(52) U.S. Cl.
CPC ......... *F16D 35/021* (2013.01); *F16D 35/024* (2013.01)
(58) Field of Classification Search
CPC ...... F16D 35/02; F16D 35/021; F16D 35/023; F16D 35/024
See application file for complete search history.

(56) References Cited

U.S. PATENT DOCUMENTS

| | | | |
|---|---|---|---|
| 5,248,018 A * | 9/1993 | Debrabander | F16D 35/023 192/58.682 |
| 2004/0084273 A1* | 5/2004 | May | F16D 35/024 192/58.61 |

(Continued)

FOREIGN PATENT DOCUMENTS

| | | |
|---|---|---|
| JP | 10-339367 | 12/1998 |
| JP | 2012-102834 | 5/2012 |
| JP | 2013-124769 | 6/2013 |

*Primary Examiner* — Richard Lorence
(74) *Attorney, Agent, or Firm* — Antonio Ha & U.S. Patent, LLC

(57) ABSTRACT

A fluid fan clutch according to the present invention comprises: a fan housing provided with a housing main body having a concave fluid operating chamber formed at a center part thereof, and a housing cover, which has a concave fluid storing chamber formed at the center part thereof and is laminated to cover an opening of the fluid operating chamber, and having a fluid collecting hole and a fluid outlet respectively formed on a bottom plate and a side wall of the fluid storing chamber; a rotor rotation shaft provided so as to penetrate the bottom plate of the housing main body; a rotor fixed and coupled to the rotor rotation shaft in the fluid operating chamber; a valve ring formed in a ring-shape to be adhered to an inner wall of the fluid storing chamber and having a penetration hole formed at a point corresponding with the fluid outlet; and a check valve provided inside the fluid storing chamber as a rotatable structure to seal one of the fluid collecting hole and the penetration hole according to the rotation angle and open the other.

5 Claims, 5 Drawing Sheets

(56) References Cited

U.S. PATENT DOCUMENTS

2008/0173513 A1* 7/2008 Boyer .................... F16D 35/024
 192/58.5
2011/0168512 A1* 7/2011 May ...................... F16D 35/024
 192/58.4

* cited by examiner

FLUID FAN CLUTCH

TECHNICAL FIELD

The present invention relates to a fluid fan clutch configured to cause a housing to rotate together with a rotor when a fluid in a storage chamber is introduced into an operation chamber during rotation of the rotor. More particularly, the present invention relates to a fluid fan clutch in which a fluid is controlled by an external signal to be introduced into a storage chamber or an operation chamber.

BACKGROUND ART

A vehicle is generally equipped with a radiator to improve cooling efficiency of a coolant for cooling the engine of the vehicle, and a cooling fan to blow air to the radiator to cool the coolant passing through the radiator is installed around the radiator. The cooling fan is connected with a fluid fan clutch, which receives power transferred via a water pump pulley of the engine and transfers the power to the cooling fan to rotate the cooling fan when the temperature of the radiator is high.

Hereinafter, a conventional fluid fan clutch will be described in detail with reference to an accompanying drawing.

FIG. 1 is a cross-sectional view schematically illustrating configuration of a typical fluid fan clutch according to conventional art.

As shown in FIG. 1, a typical fan clutch includes a fan housing 10 including a housing body 11 and a housing cover 12, which are detachably coupled to each other. A rotor 40 is rotatably installed in the inner space of the fan housing 10. The rotor 40 is integrally coupled to a rotor shaft 20, which is rotated by rotational force transferred from the engine crankshaft (not shown), such that the rotor 40 can rotate together with the rotor shaft 20. Herein, a bearing 30 is interposed between the fan housing 10 and the rotor shaft 20. When the rotor shaft 20 rotates, the fan housing 10 is not directly caused to rotate at the same time.

The inner space of the fan housing 10 is divided into a fluid storage chamber S and a fluid operation chamber D by a separation plate 50, as shown in FIG. 1. A working fluid is stored in the fluid storage chamber S, and the rotor 40 is disposed in the fluid operation chamber D. Meanwhile, a supply valve 60 operating to allow the working fluid to be supplied from the fluid storage chamber S to the fluid operation chamber D is installed on one side of the separation plate 50. The supply valve 60 is generally driven by an actuator 61 employing a bimetal element, as shown in FIG. 1.

According to this structure, as the rotor shaft 20 rotates, the rotor 40 rotates in the fluid operation chamber D of the fan housing 10 with the fan housing 10 remaining stationary. When the supply valve 60 opens, the working fluid flows from the fluid storage chamber S into the fluid operation chamber D. Thereby, the fan housing 10 rotates along with the rotor 40 in the fluid operation chamber D due to viscous resistance of the working fluid. As the viscous resistance increases with increase in the amount of the supplied working fluid, slips with respect to rotation of the rotor 40 are reduced, and the rotational speed of the fan housing 10 increases.

The working fluid supplied from the fluid storage chamber S to the fluid operation chamber D is moved outward within the fluid operation chamber D by centrifugal force according to rotation of the rotor 40, circulated along a return flow path 70 formed inside the fan housing 10 and then collected in the fluid storage chamber S, as shown in FIG. 1. As the collected working fluid continues to circulate from the fluid storage chamber S to the fluid operation chamber D in this way, the rotor 40 and the fan housing 10 rotate.

The supply valve 60 is driven by the actuator 61 employing a bimetal element, as shown in FIG. 1. Specifically, the bimetal element is configured to change according to the temperature of a coolant contained the radiator. Thereby, the actuator 61 causes the supply valve 60 to open when the temperature of the coolant is high and to close when the temperature of the coolant is low. Therefore, the fluid fun clutch is configured to properly operate according to the coolant temperature in a manner that the fan housing 10 is rotated or stopped by opening and closing of the supply valve 60 performed according to the coolant temperature.

For the conventional fluid fan clutch configured as above, however, flow of the fluid from the storage chamber S into the operation chamber D is controlled by the supply valve 60, while flow of the fluid from the operation chamber D into the storage chamber S is caused by centrifugal force of the rotor 40. Accordingly, return of the fluid cannot be artificially controlled. That is, since the fluid flows from the operation chamber D back to the storage chamber S along the return flow path 70 while the fluid is being supplied to the operation chamber D, it takes a long time to fill the operation chamber D with the fluid.

Of course, if a separate valve is added to shut the return flow path 70, flow of the fluid from the operation chamber D to the storage chamber S may be controlled. However, adding the separate valve may result in a very complex internal structure of the fan housing 10 and need a separate signal input for control of the valve, thereby making it difficult to manipulate the fluid fan clutch.

DISCLOSURE

Technical Problem

An object of the present invention devised to solve the problem lies in a fluid fan clutch which is capable of controlling flow of a fluid from an operation chamber back to a storage chamber and is provided with a very simple structure which does not make the interior of a fan housing complex while facilitating control of fluid flow.

Technical Solution

The object of the present invention can be achieved by providing a fluid fan clutch comprising a fan housing comprising a housing body provided with a concave fluid operation chamber formed at a center portion thereof and a housing cover provided with a concave fluid storage chamber formed at a center portion thereof and stacked to cover an opening of the fluid operation chamber, the fluid storage chamber being provided with a bottom plate having a fluid collection port formed therein and a side wall having a fluid discharge port formed therein; a rotor shaft disposed to penetrate the bottom plate of the housing body; a rotor fixedly coupled to the rotor shaft in the fluid operation chamber; a valve ring formed in a ring shape to closely contact an inner wall of the fluid storage chamber, the valve ring being provided with a through hole farmed at a position corresponding to the fluid discharge port; and a check valve rotatably disposed in the fluid storage chamber, the check valve being configured to seal one of the fluid collection port and the through hole and open the other one of the fluid collection port and the through hole according to a rotation angle thereof.

The check valve comprises a plurality of an extension blades radially extending with respect to a center of a bottom of the fluid storage chamber to open and close the collecting flow path, and a curved portion extending perpendicularly from the extension blades to open and close the through hole.

The valve ring is provided with a magnetic portion and a non-magnetic portion arranged alternately in a circumferential direction, and the curved portion is formed of a magnetic material, wherein the check valve rotates to cause the curved portion to close or open the through hole according to whether or not an electric current is applied to the valve ring.

The through hole is formed in the non-magnetic portion, wherein the check valve is further provided with a restoration means configured to exert a restoring rotational force to the check valve such that the current portion is positioned to close the through hole when there is no separate external force exerted.

The fluid fan clutch further comprises a stopper configured to limit a range of rotation of the check valve.

The bottom plate of the fluid storage chamber is provided with a collecting flow path extending such that one side of the collecting flow path corresponds to the fluid collection port, and the other side thereof is positioned at an edge portion of the fluid operation chamber.

Advantageous Effects

According to embodiments of the present invention, a fluid fan clutch may control flow of a fluid from an operation chamber back to a storage chamber. Thereby, the fluid fan clutch may allow quick transfer of rotational force of the rotor. In addition, the fluid collection port and the fluid discharge port may be opened and closed by one valve, and therefore the internal structure of the fan housing may become very simple. Moreover, as the fluid collection port and the fluid discharge port are opened and closed according to a signal applied by a user, the fluid fan clutch may be outstanding in terms of operational reliability.

BEST MODE

Embodiments of a fluid fan clutch in accordance with the present invention will now be described in detail with reference to the accompanying drawings.

Figure 2:
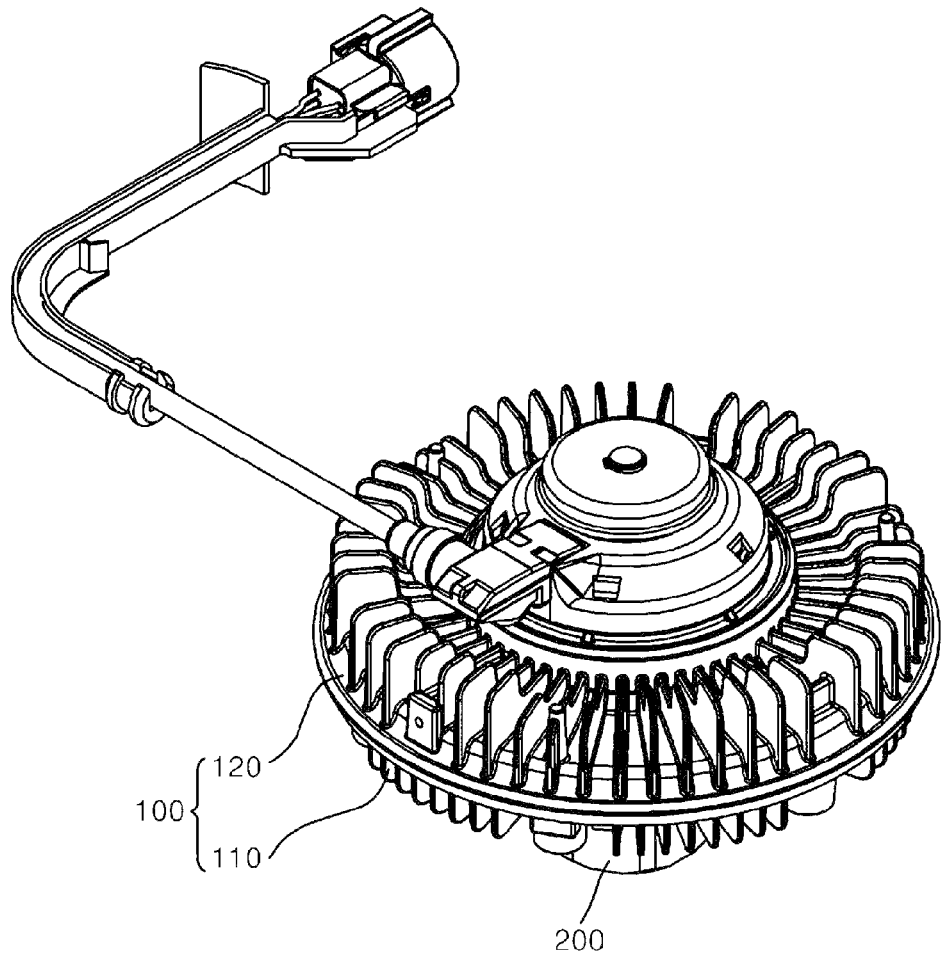
FIG. 2 is a perspective view illustrating an exemplary embodiment of a fluid fan clutch according to the present invention.
Figure 3:
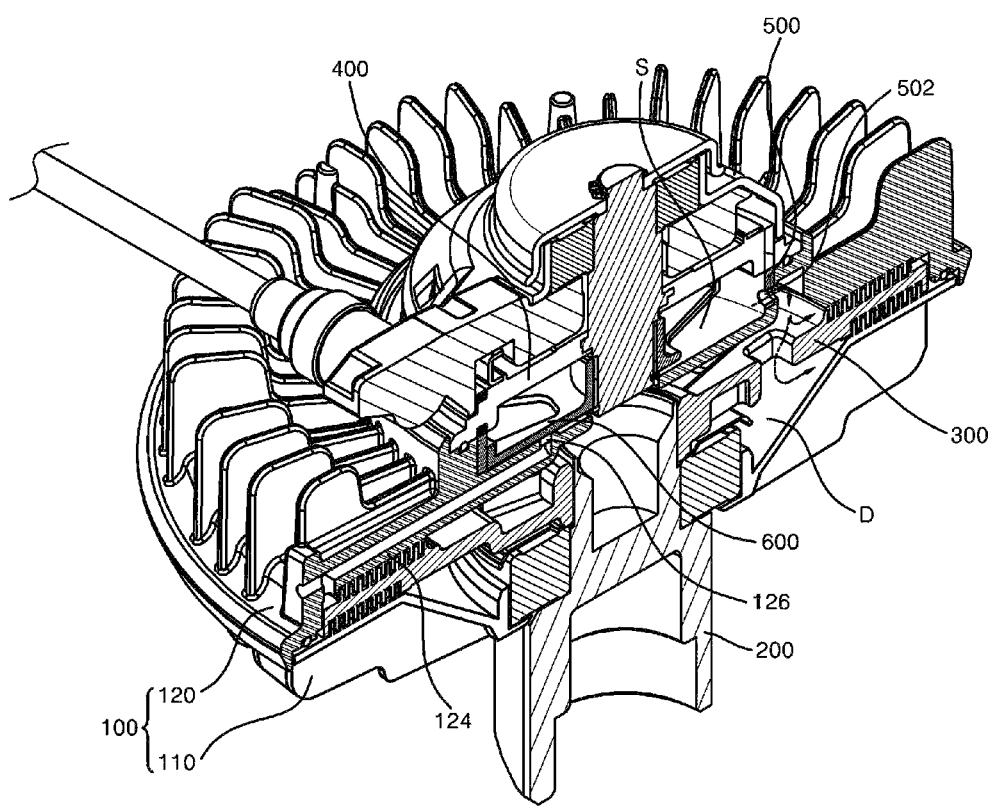
FIG. 3 is a cross-sectional perspective view of the fluid fan clutch according to the present invention, where a fluid flows into a fluid operation chamber.

FIG. 2 is a perspective view illustrating an exemplary embodiment of a fluid fan clutch according to the present invention, and FIG. 3 is a cross-sectional perspective view of the fluid fan clutch according to the present invention, where a fluid flows into a fluid operation chamber.

The fluid fan clutch is a kind of power transmission enabling rotational force of a rotor 300 to be selectively transferred to a fan housing 100 when the rotor 300 rotates about a shaft of the rotor 300. That is, the fluid fan clutch of the present invention includes the fan housing 100 provided with a housing body 110 and a housing cover 120, which are coupled to each other in a stacking manner, a rotor shaft 200 disposed to penetrate the bottom plate of the housing body 110, the rotor 300 fixedly coupled to the rotor shaft 200 between the housing body 110 and the housing cover 120 to integrally rotate together with the rotor shaft 200, a valve ring 500 formed in a ring shape to closely contact an inner wall of the fluid storage chamber S and provided with a through hole 502 formed at a position corresponding to a fluid discharge port 123, and a check valve 600 rotatably installed in the fluid storage chamber S to seal one of a fluid collection port 126 and the through hole 502 and open the other one of the fluid collection port 126 and the through hole 502 according to the rotation angle thereof.

A fluid operation chamber D having a concave shape is formed at the center portion of the housing body 110, and the fluid storage chamber S having a concave shape is formed at the center portion of the housing cover 120. The fluid collection port 126 and the fluid discharge port 123 are formed in the bottom plate and the side wall of the fluid storage chamber S, respectively. The opening portion of the fluid operation chamber D is covered by the housing cover 120 coupled to the housing body 110 in a stacking manner. Thereby, the fluid operation chamber D remains in isolation. The opening portion of the fluid storage chamber S is covered by art upper case 400, which is coupled to the housing cover 120 in a stacking manner. Thereby, the fluid storage chamber S remains in isolation. Accordingly, a fluid circulates in a manner that the fluid flows from the fluid operation chamber D into the fluid storage chamber S through the fluid collection port 126, and the fluid in the storage chamber S is supplied to the fluid operation chamber D through the fluid discharge port 123.

When the fluid flows into the fluid operation chamber D, the space between the rotor 300 and the fan housing 100 is filled with the fluid. When the rotor shaft 200 and the rotor 300 coupled thereto rotate with the space filled with the fluid, the fan housing 100 rotates together with the rotor 300. On the other hand, when the fluid flows into the fluid storage chamber S, the space between the rotor 300 and the fan housing 100 is not filled with the fluid. Accordingly, when the rotor shaft 200 and the rotor 300 coupled thereto rotate without the space filled with the fluid, the fan housing 100 does not rotate with the rotor 300 but remains stationary (wherein the "stationary" state includes rotation at a low speed). As mentioned above, the rotational force of the rotor 300 is transferred to the fan housing 100 or interrupted depending on whether the fluid flows into the fluid the fluid storage chamber S. This operation is substantially identical to that of the conventional fluid fan clutch, and thus a detailed description thereof will be skipped.

Figure 1:
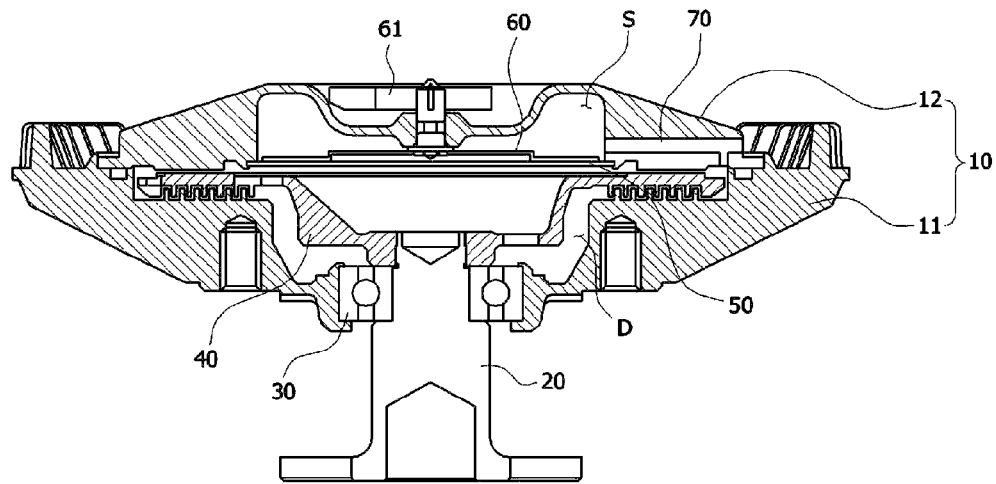
FIG. 1 is a cross-sectional view of a conventional fluid fan clutch.

In the conventional fluid fan clutch shown in FIG. 1, the return flow path 70 along which the fluid flows from the fluid operation chamber D back to the fluid storage chamber S remains constantly open, and accordingly a portion of the fluid in the fluid operation chamber D returns to the fluid storage chamber S along the return flow path 70 while the supply valve 60 opens and the fluid in the fluid storage chamber S is introduced into the fluid operation chamber D. In other words, the interior of the fluid storage chamber S needs to be filled with the fluid to transfer rotational force of the rotor 40 to the fan housing 10, but it takes a long time to fill the fluid operation chamber D since the return flow path 70 is kept open. Accordingly, it is rarely possible to implement immediate power transmission.

The fluid fan clutch in accordance with the present invention, which is designed to solve the aforementioned problem, is characterized in that both the fluid discharge port 123, through which the fluid is discharged from the fluid storage chamber S to the fluid operation chamber D, and the fluid collection port 126, through which the fluid in the fluid operation chamber D returns to the fluid storage chamber S, are configured to be selectively opened and closed by the user. As the fluid discharge port 123 and the fluid collection port 126 are configured to be selectively opened and closed by the user, the fluid in the fluid storage chamber S may be supplied to the fluid operation chamber D with the fluid discharge port 123 opened and the fluid collection port 126 closed. Thereby, the fluid in the fluid operation chamber D may be prevented from returning to the fluid storage chamber S. Accordingly, it may take a short time to fill the fluid storage chamber S with the fluid. That is, the rotational force of the rotor 300 may be immediately transferred to the fan housing 100.

Hereinafter, a detailed description will be given of the principles of opening and closing the fluid discharge port 123 and the fluid collection port 126 according to a signal applied by the user, with reference to the other drawings.

Figure 4:
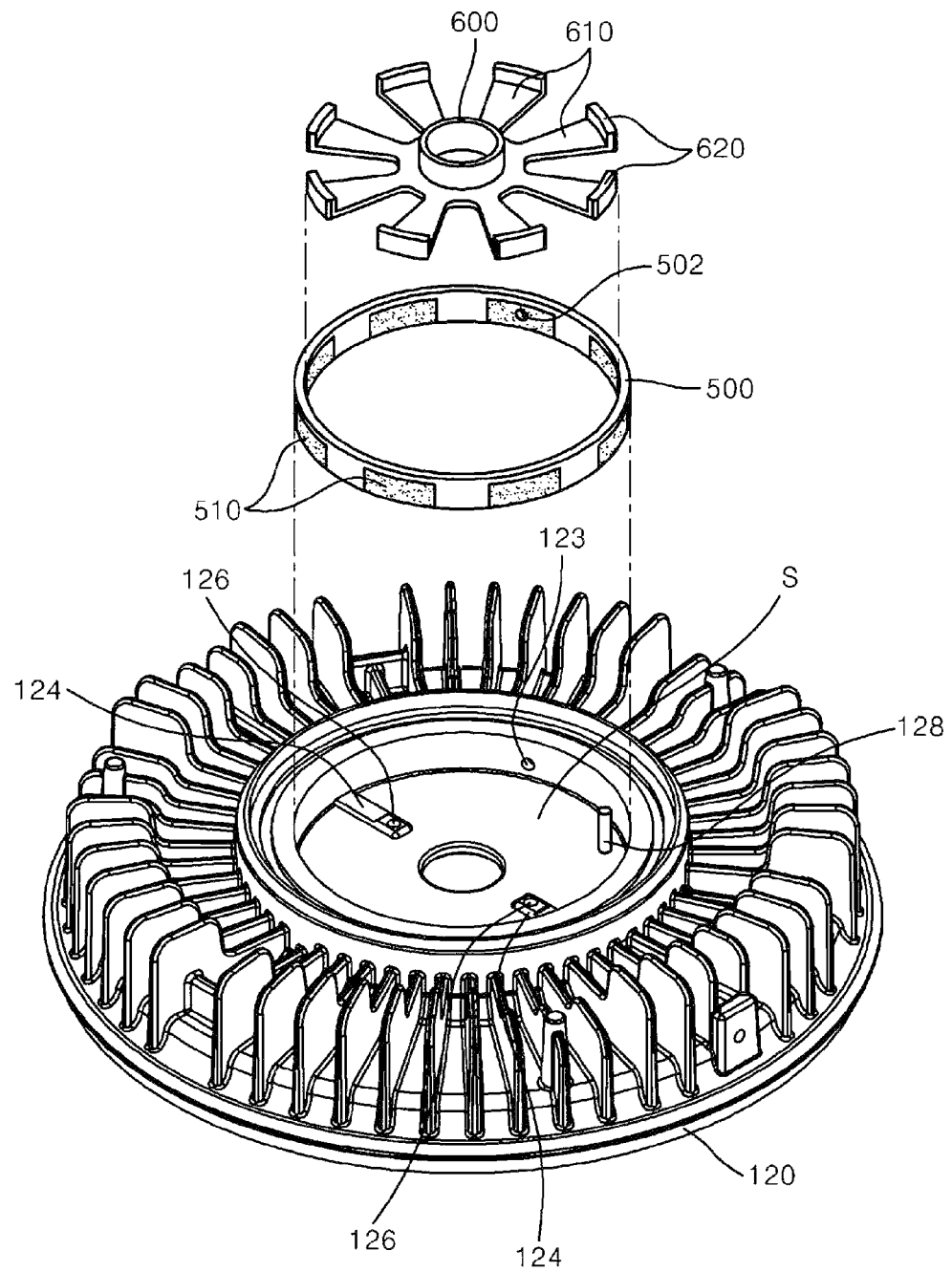
FIG. 4 is an exploded perspective view illustrating installation of a valve ring and a check valve.
Figure 5:
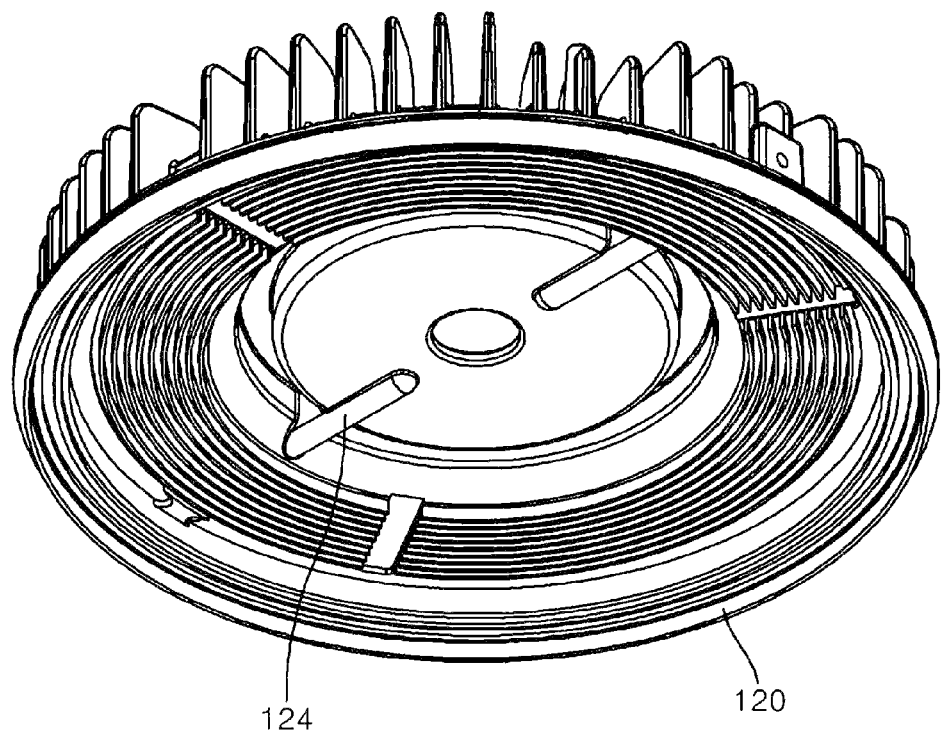
FIG. 5 is a bottom perspective view illustrating a housing cover included in the present invention.
Figure 6:
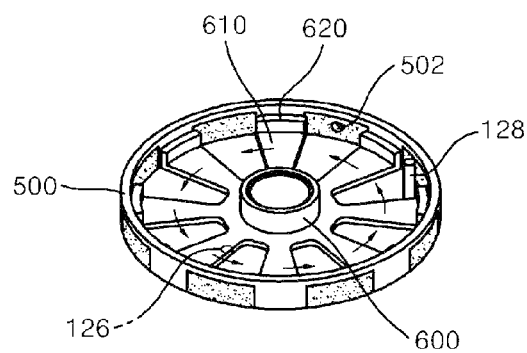
FIG. 6 is a perspective view illustrating coupling between the valve ring and the check valve when the fluid flows into the fluid operation chamber.

FIG. 4 is an exploded perspective view illustrating installation of a valve ring and a check valve, and FIG. 5 is a bottom perspective view illustrating a housing cover included in the present invention. FIG. 6 is a perspective view illustrating coupling between the valve ring and the check valve when the fluid flows into the fluid operation chamber.

The fluid fan clutch in accordance with the present invention is characterized in that the fluid discharge port 123 and the fluid collection port 126 are opened and closed by one check valve 600. Specifically, the check valve 600 includes a plurality of extension blades 610 radially extending with respect to the center of the bottom of the fluid storage chamber S to open and close a collecting flow path 124 and a curved portion 620 extending perpendicularly (upwardly in this embodiment) from the extension blades 610, as shown in FIG. 4. When the check valve 600 rotates about the bottom centerline of the fluid storage chamber S, the extension blades 610 open and close the fluid collection port 126, and the curved portion 620 opens and closes the through hole 502. Herein, the through hole 502 is formed to communicate with the fluid discharge port 123. Accordingly, when the through hole 502 is opened and closed by the curved portion 620, the fluid discharge port 123 is also opened and closed.

For the fluid fan clutch of the present invention, the interior of the fan housing 100 is simplified because the fluid collection port 126 and the fluid discharge port 123 are configured to be opened and closed by one check valve 600 as described above. Thereby, manufacturing cost is reduced, maintenance of a product is facilitated, and compact design of the product is implementable.

Meanwhile, the valve ring 500 includes a magnetic portion and a non-magnetic portion which are alternately arranged in the circumferential direction thereof such that the check valve 600 can selectively open and close the fluid collection port 126 and the fluid discharge port 123 according to a signal applied by the user. Specifically, the valve ring 500 is formed of a magnetic material such as metal, and multiple non-magnetic blocks 510 are disposed spaced from each other along the circumference of the valve ring 500, and the curved portion 620 is preferably formed of a magnetic material. The non-magnetic blocks 510 may be formed of any material including a synthetic resin and ceramic so long as the material is not electro-magnetized by application of electric current.

With the valve ring 500 and the check valve 600 are configured as described above, the curved portion 620 will rotate to face the magnetic portion of the valve ring 500 (the portion without the non-magnetic blocks 510) when the valve ring 500 is electro-magnetized by current applied to the valve ring 500. Thereby, the fluid discharge port 123 will be opened and the fluid collection port 126 will be closed by the extension blades 610. To keep the fluid discharge port 123 open while current is applied to the valve ring 500, the through hole 502 is preferably formed in the non-magnetic portion.

Figure 7:
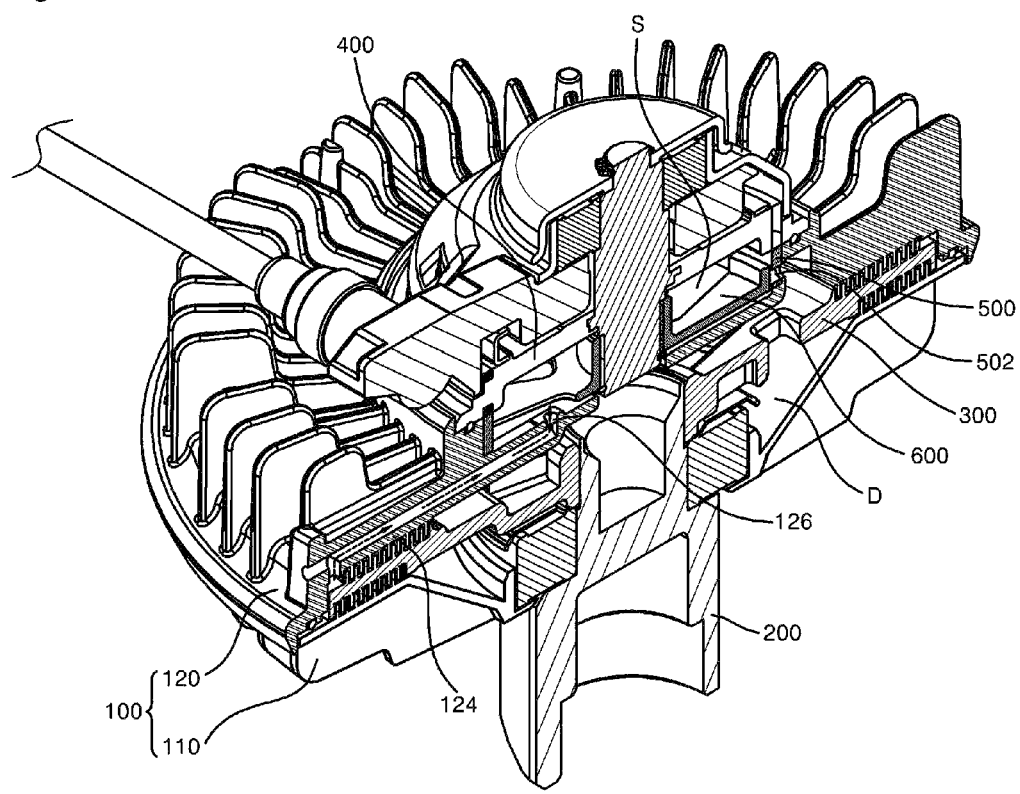
FIG. 7 is a cross-sectional perspective view illustrating an exemplary embodiment of the fluid fan clutch in accordance with the present invention, where the fluid returns to the fluid storage chamber.
Figure 8:
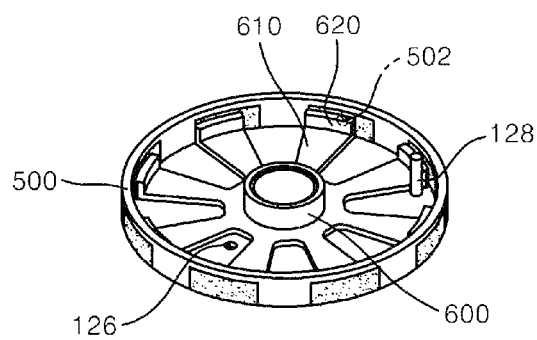
FIG. 8 is a perspective view illustrating coupling between the valve ring and the check valve when the fluid returns to the fluid storing chamber.

FIG. 7 is a cross-sectional perspective view illustrating an exemplary embodiment of the fluid fan clutch in accordance with the present invention, where the fluid returns to the fluid storage chamber. FIG. 8 is a perspective view illustrating coupling between the valve ring and the check valve when the fluid returns to the fluid storing chamber.

When the current applied to the valve ring 500 is interrupted with the fluid discharge port 133 opened and the fluid collection port 126 closed as shown in FIGS. 3 to 6, the check valve 600 rotates by a certain angle such that the curved portion 620 closes the fluid discharge port 123 and the extension blades 610 open the fluid collection port 126, as shown in FIGS. 7 and 8. Thereby, the fluid in the fluid operation chamber D returns to the fluid storage chamber S along the collecting flow path 124. Accordingly, if the fluid operation chamber D is not filled with the fluid, the fan housing 100 remains stationary despite rotation of the rotor 300 (wherein the "stationary" state includes rotation at a low speed). Herein, to cause the check valve 600 to rotate and come to a position where the curved portion 620 closes the through hole 502, and the extension blades 610 open the fluid collection port 126 as shown in FIGS. 7 and 8 when current applied to the valve ring 500 is interrupted, namely when no external force is separately applied to the check valve 600, the check valve 600 may need to be additionally provided with a restoration means (not shown) configured to exert restoring rotational force. As the restoration means, any elastic means including a spring pin and a coil spring may be employed so long as the elastic means can return the cheek valve 600 to the original position thereof (the position shown in FIG. 8).

In the fluid fan clutch of the present invention, when the fluid collection port 126 is opened and the fluid in the fluid operation chamber D returns to the fluid storage chamber S, the fluid discharge port 123 is closed by the curved portion 620, and thus the fluid is prevented from being discharged from the fluid storage chamber S to the fluid operation chamber D. Accordingly, the interior of the fluid operation chamber D may be quickly emptied. That is, transmission of power between the rotor 300 and the fan housing 100 may be immediately interrupted.

Meanwhile, a stopper 128 limiting the range of rotation of the check valve 600 is preferably provided to stop the check valve 600 rotated by the restoration means at a position where the curved, portion 620 closes the through bole 502, and the extension blades 610 open the fluid collection port 126. The stopper 128 protrudes upward from the bottom of the fluid storage chamber S and is positioned between two neighboring extension blades 610. Accordingly, when the stopper 128 interferes with the extension blades 610 as shown in FIG. 8, the check valve 600 rotated by the restoration means does not rotate anymore but remains stationary. While this embodiment illustrates the stopper 128 as extending from the bottom of the fluid storage chamber S upward to interfere with the extension blades 610, the stopper 128 is replaceable with any structure which is capable of limiting the rotation angle of the check valve 600.

Meanwhile, when the rotor 300 and the fan housing 100 rotate, the fluid gathers at an edge portion of the fluid operating chamber D within the fluid operation chamber D due to centrifugal force. Accordingly, the inlet of the collecting flow path 124 for transporting the fluid from the fluid operation chamber D back to the fluid storage chamber S is preferably arranged at an edge portion of the fluid storage chamber S. Specifically, the collecting flow path 124 for transporting the fluid from the fluid operation chamber D back to the fluid storage chamber S is provided to the bottom plate of the fluid storage chamber S. The collecting flow path 124 extends in a straight line such that one side (the outlet) of the collecting flow path 124 communicating with the fluid storage chamber S corresponds to the fluid collection port 126, and the other side (the inlet) of the collecting flow path 124 communicating with the fluid operation chamber D is positioned near the edge of the oil operation chamber.

As the collecting flow path 124 is formed to extend in the diametric direction of the fluid operation chamber D as described above, the fluid in the fluid operation chamber D may smoothly return to the fluid storage chamber S, and transmission of power between the rotor 300 and the fan housing 100 may be interrupted quickly. While this embodiment illustrates that two collecting flow paths 124 are provided as shown in FIG. 4, the number of the collecting flow paths 124 may depend on the choice of the designer.

The detailed description given above is intended to explain exemplary embodiments of the present invention, rather than to show the only embodiments that can be implemented according to the invention. The present invention should be interpreted as defined by the appended claims. It will be apparent to those skilled in the art that various modifications and variations can be made in the present invention without departing from the spirit or scope of the invention.

The invention claimed is:

1. A fluid fan clutch comprising:
 a fan housing comprising a housing body provided with a concave fluid operation chamber formed at a center portion thereof and a housing cover provided with a concave fluid storage chamber formed at a center portion thereof and stacked to cover an opening of the fluid operation chamber, the fluid storage chamber being provided with a bottom plate having a fluid collection port formed therein and a side wall having a fluid discharge port formed therein;
 a rotor shaft disposed to penetrate the bottom plate of the housing body;
 a rotor fixedly coupled to the rotor shaft in the fluid operation chamber;
 a valve ring formed in a ring shape to closely contact an inner wall of the fluid storage chamber, the valve ring being provided with a through hole formed at a position corresponding to the fluid discharge port; and
 a check valve rotatably disposed in the fluid storage chamber, the check valve being configured to seal one of the fluid collection port and the through hole and open the other one of the fluid collection port and the through hole according to a rotation angle thereof,
 wherein the bottom plate of the fluid storage chamber is provided with a collecting flow path extending such that one side of the collecting flow path corresponds to the fluid collection port, and the other side thereof is positioned at an edge portion of the fluid operation chamber.

2. The fluid fan clutch according to claim 1, wherein the check valve comprises a plurality of an extension blades radially extending with respect to a center of a bottom of the fluid storage chamber to open and dose the collecting flow path, and a curved portion extending perpendicularly from the extension blades to open and close the through hole.

3. The fluid fan clutch according to claim 2, wherein the valve ring is provided with a magnetic portion and a non-magnetic portion arranged alternately in a circumferential direction, and the curved portion is formed of a magnetic material,
 wherein the check valve rotates to cause the curved portion to close or open the through hole according to whether or not an electric current is applied to the valve ring.

4. The fluid fan clutch according to claim 3, wherein the through hole is formed in the non-magnetic portion,
 wherein the check valve is further provided with a restoration means configured to exert a restoring rotational force to the check valve such that the current portion is positioned to close the through hole when there is no separate external force exerted.

5. The fluid fan clutch according to claim 4, further comprising a stopper configured to limit a range of rotation of the check valve.

* * * * *